Jan. 29, 1946. J. V. DRUMMOND 2,393,597
COMPOSITION OR ADMIXTURE FOR CONCRETE AND THE
PROCESS OF INCORPORATING IT THEREIN
Filed Nov. 21, 1939

Inventor
John V. Drummond,
By John L. Woodward
Attorney

Patented Jan. 29, 1946

2,393,597

UNITED STATES PATENT OFFICE 2,393,597

COMPOSITION OR ADMIXTURE FOR CONCRETE AND THE PROCESS OF INCORPORATING IT THEREIN

John V. Drummond, Washington, D. C.

Application November 21, 1939, Serial No. 305,550

9 Claims. (Cl. 106—314)

My invention relates broadly to a composition of matter composed of a collection of compounds which have been combined in a novel manner to produce a composition which is adapted to be used as an admixture and to be added to cement, concrete, mortar and the like.

It is an object of my invention to produce a composition which is composed of non-organic active materials, and when integrally mixed in concrete, it combines with the excess water remaining after hydration of the cement to form a hard insoluble substance which decreases the permeability and seals the voids of the concrete material.

It is also an object of my invention to produce a composition of matter which, when admixed with concrete, mortar or the like, will chemically react with the cement of the concrete and the like to produce concrete the voids of which have been sealed to a maximum and as a result the concrete has been made waterproof. I prevent the capillary action through the concrete because the voids throughout the body of the concrete have been sealed.

It is a further object of my invention to make a composition of matter which, when added to concrete, mortar, or the like, will increase the strength of concrete to from thirty (30) to fifty (50) per cent and higher over the concretes now being used or heretofore patented.

It is a further object of this invention to produce a composition of matter which, when mixed with ordinary concrete material, will insure a bond between the concrete with my material added thereto and an old section of "set" concrete.

It is a further object of my invention to produce a composition of matter which when added to concrete will make the concrete acid proof. Since the voids throughout the body of the concrete have been sealed, acids cannot penetrate into the body of the concrete. Heretofore acids have been able to penetrate into the concrete and the concrete was blown or broken up due to the chemical reaction of the acids within the body of the concrete.

It is a further object of this invention to compound a composition of matter which when added to concrete will retard deterioration thereof to a minimum so that no oxidation occurs and no dust will arise from the surface of the concrete.

It is a further object of this invention to provide a composition of matter which when added to concrete, will produce a concrete material wherein the moisture content is stabilized. That is, when the novel composition of matter has been added to the concrete, it reacts with the cementitious portion and the voids of the concrete are sealed, and the moisture content therein is sealed in the body of the concrete.

It is a further object of this invention to produce a composition of matter which, when mixed with concrete, reacts with the cement of the concrete to form an insoluble compound which increases the tensile strength thereof.

It is a further object of this invention to provide a novel composition of matter adapted to be mixed with concrete and wherein the strength and plastic workability of the concrete is increased without changing the water ratios used in concrete mixes not having my novel composition added thereto.

Another object of this invention relates to producing a composition of matter which is adapted to be added to concrete and to set up a reaction between the novel composition of matter and the cement of the concrete whereby the crystalline growth of the cement is enhanced.

It is a further object of this invention to compound a composition of matter which, when admixed with concrete, will produce a concrete which better resists the weather cycles such as high and low temperatures, freezing, thawing and the like than any of the prior concretes.

It is a further object of this invention to produce a composition of matter which when mixed with a concrete mixture will chemically react with the cement therein so that there is an internal curing of the concrete.

It is a further object of this invention to produce a composition adapted to be added to a concrete mix, the composition reducing the porosity of the cement and also sealing the mechanical voids in the concrete to retain the free moisture or water therein.

Figure 1:
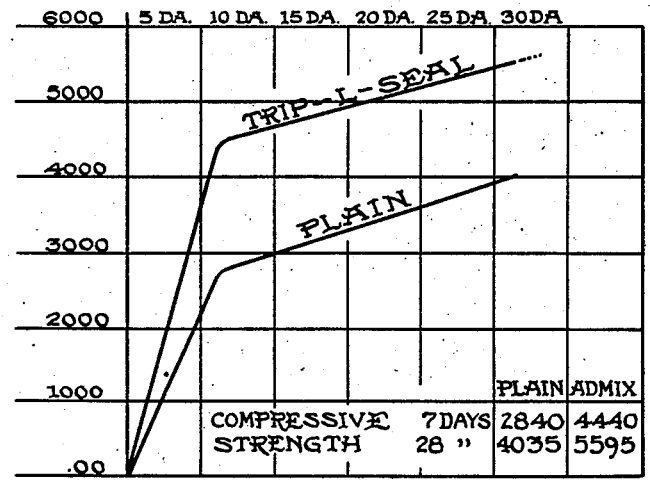
Figure 1 is a chart of a comparative test showing the difference in the compressive strength of a concrete mixture with my composition therein and designated "Trip-L-Seal," and a concrete mixture without my composition incorporated therein and which is designated as plain.
Figure 2:
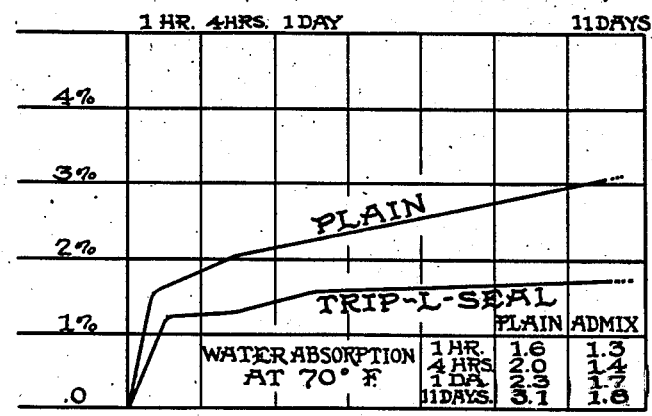
Figure 2 is a chart of a comparative test showing the difference in the water absorption of a concrete mixture with my composition therein and designated as "Trip-L-Seal," and a concrete mixture without my composition incorporated therein and which is designated as plain.

My novel composition of matter comprises dry finely ground sodium silicate, calcium chloride, potassium alum (potassium aluminum sulfate), and diatomaceous earth mixed together. All of these elements are ground to the fine powder and are adapted to be mixed with Portland cement or its equivalent when the said cement is to be added to a concrete mixture.

The critical percentages of my composition by weight to the amount of cement is as follows:

|  | Per cent |
|---|---|
| Sodium silicate | 1¼ |
| Calcium chloride | ½ |
| Potassium alum | ½ |
| Diatomaceous earth | 1¼ |

When aluminum hydroxide is added to the composition the percentages by weight to the amount of cement is as follows:

|  | Per cent |
|---|---|
| Sodium silicate | 1¼ |
| Calcium chloride | ½ |
| Potassium alum | ½ |
| Diatomaceous earth | 1¼ |
| Aluminum hydroxide | ½ |

It is necessary to use at least three and one-half (3½%) per cent by weight of the composition comprising sodium silicate, calcium chloride, potassium alum and diatomaceous earth to the weight of cement used in such concrete mixtures as the 1-2-4; or 1-1-2; 1-3-5 or other similar mixes.

I find it possible to obtain very good results with my composition by using a range of one (1%) per cent to three (3%) per cent of sodium silicate; a range of one-fourth (¼%) per cent to one-half (½%) per cent of the calcium chloride; a range of one-fourth (¼%) per cent to one (1%) per cent of potassium alum; a range of one-half (½%) per cent to three (3%) per cent of diatomaceous earth; and a range of aluminum hydroxide when used of one-fourth (¼%) per cent to one (1%) per cent. Of course the optimum results obtained are set forth in the above tables.

The sodium silicate is the basic substance of my composition of matter. The calcium chloride in its chemical reaction in the composition and with the cement of the concrete acts as a distributor of the sodium silicate and distributes it evenly and homogenously throughout the concrete. The diatomaceous earth in the composition and in combination with the concrete mix is a plasticizing agent. That is, the diatomaceous earth increases the workability of the concrete mix and insures a homogenous mass, wherein all of the elements are distributed homogenously throughout the concrete. The aluminum hydroxide is an agent to further increase the sealing of the pores of the cement and the mechanical voids of the concrete.

It is my theory when employing the group of compounds of the novel composition of matter which is to be added to a concrete mix, and consisting of sodium silicate, potassium alum, calcium chloride in solution and diatomaceous earth in suspension the composition will chemically react with the cement of a concrete mix and this reaction between the composition of matter and the cement of the concrete mix enlarges or increases the crystalline growth of the cement, and the crystals of the cement being more firmly interlocked or bonded together, a greater tensile and compression strength is produced in the concrete. The composition of matter after reacting with the cement of the concrete mix and having increased the crystalline growth of the cement, will seal the voids of the cement. The expansive action or growth of the crystals of the cement takes place after initial hydration of the cement.

It has also been found that bauxite may be used instead of aluminum hydroxide and concrete is produced which can meet certain needs. Instead of diatomaceous earth it is possible to use aluminum silicate (kaolin) or other earth silicates and obtain very good results in a concrete.

After my composition has been added to a concrete mix, the composition chemically reacts with the cement and also the excess water remaining after hydration to form an insoluble compound throughout the body of the concrete.

As a result of my composition of matter chemically reacting with the cement of the concrete, the time of curing the concrete is greatly reduced, the time for curing being approximately from forty-eight (48) to seventy-two (72) hours. Further the internal curing of the concrete reduces the hazard of the concrete breaking up under pressure at the outset of setting.

Sodium silicate, calcium chloride, potassium alum, and diatomaceous earth mixed together and added to a concrete mix, chemically reacts with the cement and enlarges the crystals thereof or increases their crystalline growth which results in an unusual bond and strength of the concrete.

Heretofore concrete which has been subject to continuous exposure to acids and the like as in dairies, easily deteriorated and the concrete flooring had to be replaced quite often. With the use of my improved composition of matter the voids throughout the concrete have been sealed and the concrete is therefore impervious to the effects of acids.

Further when my novel composition of matter has been added to concrete, it seals the voids so that water cannot penetrate the concrete and as a result the concrete is not subject to the results of weather changes.

Concrete with my composition added thereto has a greater tensile and compression strength than obtained in the prior concretes. The greater compression and tensile strength is due to the crystals of the cement having been enlarged and more firmly interlocked than heretofore accomplished.

A microstructure or microphoto showing of a section of concrete having my composition embedded therein discloses that there is no continuity of voids in the concrete while a sectional view of the concretes now being used shows that the voids have a continuity therein.

In a test of three cylinders of concrete with the composition comprising sodium silicate, calcium chloride, potassium alum, and diatomaceous earth therein the following results were obtained:

| Age at test, days | Approx. w/c ratio (gal./bag) | Compressive total load, lbs. | Strength—unit load, lbs./sq. in. |
|---|---|---|---|
| 7 | 5.9 | 99,000 | 3,500 |
| 7 | 5.7 | 107,100 | 3,790 |
| 7 | 6.3 | 100,600 | 3,560 |
|  |  | mean | 3,617 |
| 28 | 5.9 | 152,100 | 5,380 |
| 28 | 5.7 | 156,900 | 5,550 |
| 28 | 6.3 | 135,400 | 4,970 |
|  |  | mean | 5,300 |

A comparative test has been made of two concrete mixtures, one concrete mixture composed of the following ratios of ingredients (15.4 pounds of cement, 34.2 pounds of sand and 73.2 pounds of gravel) with composition comprising sodium silicate, calcium chloride, potassium alum and diatomaceous earth incorporated therein; 1.6 pounds, and the other concrete mixture consisting of the same ratios of ingredients except the composition comprising sodium silicate, calcium chloride, potassium alum, and diatomaceous earth, and the test shows the difference in compressive strengths and absorptive qualities. The test shows the following:

| Physical properties | Concrete without my composition | Concrete with my composition |
|---|---|---|
| Compressive strength 7 days, lbs. per sq. in. | 2,840 | 4,440 |
| Compressive strength 28 days, lbs. per sq. in. | 4,035 | 5,595 |
| Water absorption at 70° F., per cent: | | |
| 1 hour | 1.6 | 1.3 |
| 4 hours | 2.0 | 1.4 |
| 1 day | 2.3 | 1.7 |
| 11 days | 3.1 | 1.8 |

I claim:

1. An admixture for a concrete mix, mortar and the like comprising 1¼% of sodium silicate, ½% of calcium chloride, ½% of potassium alum, and 1¼% of diatomaceous earth.

2. An admixture for a concrete mix and the like comprising a range of 1% to 3% of sodium silicate, a range of ¼% to ½% of calcium chloride, a range of ¼% to 1% of potassium alum, and a range of ½% to 3% of diatomaceous earth.

3. As a new article of manufacture, a concrete block including a concrete mixture including Portland cement and a composition comprising 1¼% of sodium silicate by weight to the weight of cement, ½% of calcium chloride by weight to the weight of cement, ½% of potassium alum by weight to the weight of cement, and 1¼% of diatomaceous earth by weight to the weight of the cement.

4. As a new article of manufacture, a concrete block including a concrete mixture including Portland cement and a composition comprising a range of 1% to 3% of sodium silicate by weight to the weight of cement, a range of ¼% to ½% of calcium chloride by weight to the weight of the cement, a range of ¼% to 1% of potassium alum by weight to the weight of the cement, and a range of ½% to 3% of diatomaceous earth by weight to the weight of the cement.

5. A process of producing a concrete comprising mixing a concrete mix including Portland cement, adding to the concrete mix a composition comprising 1¼% of sodium silicate by weight to the weight of the cement, ½% of calcium chloride by weight to the weight of the cement, ½% of potassium alum by weight to the weight of the cement, and 1¼% of diatomaceous earth by weight to the weight of the cement, and then mixing together the concrete mix and the composition.

6. A process of producing a concrete comprising mixing a concrete mixture including Portland cement, then adding to the concrete mixture a composition comprising a range of 1% to 3% of sodium silicate by weight to the weight of the cement, a range of ¼% to ½% of calcium chloride by weight to the weight of the cement, a range of ½% to 1% of potassium alum by weight to the weight of the cement, and a range of ½% to 3% of diatomaceous earth by weight to the weight of the cement.

7. A process of producing a concrete comprising mixing a concrete mixture, then adding to the concrete mixture a ground composition comprising a range of 1% to 3% of dry sodium silicate, a range of ¼% to ½% of calcium chloride, a range of ½% to 1% of potassium alum, and a range of ½% to 3% of diatomaceous earth.

8. A composition of the character described comprising a concrete mixture, and finely divided composition comprising 1¼% of sodium silicate, ½% of calcium chloride, ½% of potassium alum, and 1¼% of diatomaceous earth.

9. A composition of the character described comprising a concrete mixture including Portland cement, and a composition comprising a range of 1% to 3% of sodium silicate by weight to the weight of the cement, a range of ¼% to ½% of calcium chloride by weight to the weight of the cement, a range of ¼% to 1% of potassium alum by weight to the weight of the cement, and a range of ½% to 3% of diatomaceous earth by weight to the weight of the cement.

JOHN V. DRUMMOND.